(12) United States Patent
Chen

(10) Patent No.: US 8,733,524 B2
(45) Date of Patent: May 27, 2014

(54) DRIVING SYSTEM FOR BICYCLE HUB

(75) Inventor: Chun-Hsung Chen, Taichung Hsien (TW)

(73) Assignee: Joy Industrial Co., Ltd., Taichung Hsien (TW)

( * ) Notice: Subject to any disclaimer, the term of this patent is extended or adjusted under 35 U.S.C. 154(b) by 28 days.

(21) Appl. No.: 13/570,355

(22) Filed: Aug. 9, 2012

(65) Prior Publication Data
US 2014/0042799 A1    Feb. 13, 2014

(51) Int. Cl.
*F16D 23/00*    (2006.01)

(52) U.S. Cl.
USPC ........................................................... 192/64

(58) Field of Classification Search
USPC ............................ 192/45.1, 31, 41 R, 45.001
See application file for complete search history.

(56) References Cited

U.S. PATENT DOCUMENTS

| | | | | |
|---|---|---|---|---|
| 8,276,731 | B2 * | 10/2012 | Chen | 192/64 |
| 8,443,951 | B1 * | 5/2013 | Hsieh | 192/64 |
| 2007/0289836 | A1 * | 12/2007 | Lin et al. | 192/64 |
| 2010/0252389 | A1 * | 10/2010 | French | 192/64 |
| 2011/0094846 | A1 * | 4/2011 | Wu | 192/64 |

\* cited by examiner

*Primary Examiner* — David D Le
*Assistant Examiner* — David J Hlavka
(74) *Attorney, Agent, or Firm* — Rosenberg, Klein & Lee

(57) ABSTRACT

A bicycle hub driving system includes a hub with a socket unit connected thereto. An axle unit extends through the hub and the socket unit. A clutch driving device is located between the ratchet unit and the hub. The clutch driving device includes a clutch unit, a driving unit and a driving member located between the clutch unit and the driving unit. The clutch unit includes a first ratchet portion on the ratchet unit and a second ratchet portion on the driving member. The driving unit includes first driving teeth on the hub and second driving teeth on the driving member. By the linear movement of the riving member between the first driving teeth and the first ratchet portion, the first and second ratchet portions are engaged with each other or disengaged from each other to co-rotate the hub and the socket unit in one direction.

14 Claims, 15 Drawing Sheets

DRIVING SYSTEM FOR BICYCLE HUB

FIELD OF THE INVENTION

The present invention relates to a driving system, and more particularly, to a driving system for bicycle hub and the driving system is clutched linearly to drive the hub in one direction.

BACKGROUND OF THE INVENTION

The conventional way to operate bicycles is to rotate the crank forward so that the wheels rotate forward. When the user stop to tread the pedals, the wheels still move forward by initial force and no work is output by the user. When the user rotates the crank backward, the wheels are not affected by the backward action because there is a ratchet mechanism in the hub.

The bicycle hub generally has a hub with bearings located therein, an axle extends through the hub and the bears. A socket unit is connected to the hub and a ratchet unit is connected to the socket unit. The socket unit is connected with a chain so that when the chain drives the socket unit, the ratchet unit is rotated which drives the hub to rotate in the same direction.

The ratchet units are cataloged by radial driving type and end driving type, wherein the radial driving type means that the first ratchet gear mounted to the socket unit and the second ratchet gear is located in the hub. The first and second ratchet gears are engaged with each other. The pawls rotate in the radial direction of the axle to contact the driving ratchet gear. The end driving type is also known as axial driving type, which means that the first ratchet gear is mounted to the end face of the socket unit and the second ratchet gear is located in the hub. The first and second ratchet gears are engaged with each other. The two ratchet gears are engaged in the axial direction of the axle.

Taiwan Patent Application No. 099104719 discloses an axle rotatably extends through a hub, a gear unit rotatably connected to the axle and located close to the hub. The gear unit has an inner end inserted into the hub, an outer end located in opposite to the inner end, and multiple grooves defined in the inner end and extending toward the outer end. The inner end has a bottom which define the grooves and multiple sidewalls extending radially from the bottom so as to be cooperated with the bottom to define the grooves. Multiple stepped portions extend from the sidewalls and located in the grooves. A clutch unit is located between the hub and the inner end of the gear unit. The clutch unit has a toothed ring located in the hub, multiple pawls pivotably connected to the grooves, and a resilient member located in the inner end and keeping the toothed ring and the pawls to move in one direction. The pawls respectively contact the stepped portions and are located by a gap from the sidewalls respectively.

Taiwan Utility Application No. 100219245 discloses a one-way ratchet unit which keeps the sprocket unit and the hub to rotate in one direction only. The ratchet unit comprises a first engaging portion connected to one end of the hub and having a first one-way ratchet gear which has multiple teeth each have a tip, a tool and two inclined guide sides. A second engaging portion is connected to an end of the sprocket unit and has multiple second one-way ratchet gear which has multiple teeth each have a tip, a tool and two inclined guide sides. The first and second one-way ratchet gears are engaged with each other in one directly. At least one resilient member is used to allow the first and second one-way ratchet gears to move over each other when the rotation direction is in opposite to the effective direction. At least one protrusion extends from the tip of the ratchet teeth of one of the first and second ratchet gears. The at least one protrusion extends along the inclined guide sides of the teeth. Those teeth without the at least one protrusion has a recess. At least one yield portion which is recessed in the root of the teeth of one of the first and second ratchet gears. When the first and second ratchet gears are engaged with each other, the recess is engaged with the at least one yield portion.

U.S. Pat. No. 6,123,179 discloses a bicycle freewheel hub and includes a hollow hub shell sleeved rotatably on a shaft, a cylindrical driving member sleeved rotatably on the shaft and disposed adjacent to the hub shell, and a clutch unit including first and second clutch members sleeved rotatably on the shaft. The first clutch member is coupled to the driving member. The second clutch member is coupled to the hub shell. Each of the clutch members has an annular end face which extends in a direction substantially perpendicular to the shaft. The annular end face of each of the clutch members has inclined teeth that are arranged annularly around the shaft and that project axially from the annular end face. The annular end face of the second clutch member confronts the annular end face of the first clutch member. The inclined teeth of the second clutch member engage the inclined teeth of the first clutch member when the driving member rotates in a first direction, and disengage therefrom when the driving member rotates in a second direction opposite to the first direction. A spring biases one of the first and second clutch members so as to keep interengagement of the first and second clutch members.

The first two Taiwan applications are radial driving type and the U.S. Pat. No. 6,123,179 is axial driving type. For the axial driving type hub, all of the ratchet teeth have to be engaged with each other to drive the hub so that the contact area of the ratchet teeth is larger than that of the radial driving type hub. Therefore, the axial driving type hub has better driving force. For the radial driving type hub, the distance of the driving position from the axle is longer than that of the axial driving type hub, so that the radial driving type hub saves effort.

For the radial driving type hub, there are three or four pawls are required on the socket unit and the pawls are pivotable radially to be engaged with the ratchet teeth on the hub. A resilient member is used to keep the pawls to be pivoted in one direction. However, the way that the pawl are pivoted to contact the individual ratchet tooth has slower linear movement than that of the axial driving type hub, so that the transmission of the driving force slightly delays. The four pawls provide limited contact area which provides less driving force and the tips of the pawls are easily worn out. When the tips of the pawls are damaged, the pawls may not able to contact the ratchet teeth to effectively drive the hub. If the four pawls have different levels of wearing, the stress will be concentrated at the tip of the pawl with less wearing, so that the driving force is not evenly spread on the four pawls. In other words, once one of the pawls is replaced, the rest of the three pawls have to be replaced. This means higher maintenance expense is required.

The present invention intends to provide a ratchet unit which is used for the radial driving type hub and provides larger driving force which is evenly spread to the ratchet teeth to increase the life of the ratchet unit.

SUMMARY OF THE INVENTION

The present invention relates to a bicycle hub driving system and comprises a hub with a socket unit connected thereto.

An axle unit extends through the hub and the socket unit. A clutch driving device is located between the ratchet unit and the hub. The clutch driving device includes a clutch unit, a driving unit and a driving member located between the clutch unit and the driving unit. The clutch unit includes a first ratchet portion on the ratchet unit and a second ratchet portion on the driving member. The driving unit includes first driving teeth on the hub and second driving teeth on the driving member. By the linear movement of the riving member between the first driving teeth and the first ratchet portion, the first and second ratchet portions are engaged with each other or disengaged from each other to co-rotate the hub and the socket unit in one direction. A return member is mounted to the driving member and the first ratchet portion to move the driving member linearly toward the first ratchet portion.

The clutch driving device moves linearly and drives the hub radially so that the operation of the hub saves effort and the hub is operated sensitively.

The driving member of the clutch driving device moves linearly and has multiple ratchet teeth and multiple driving teeth so as to have larger contact area to increase the transmission force.

The load to the clutch driving device is evenly spread to the ratchet portions of the driving member so that the wearing for the ratchet teeth are even to avoid single ratchet tooth from overly worn out.

The driving member has multiple ratchet teeth so that even if one of the ratchet teeth is damaged, the driving member can be operated normally.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
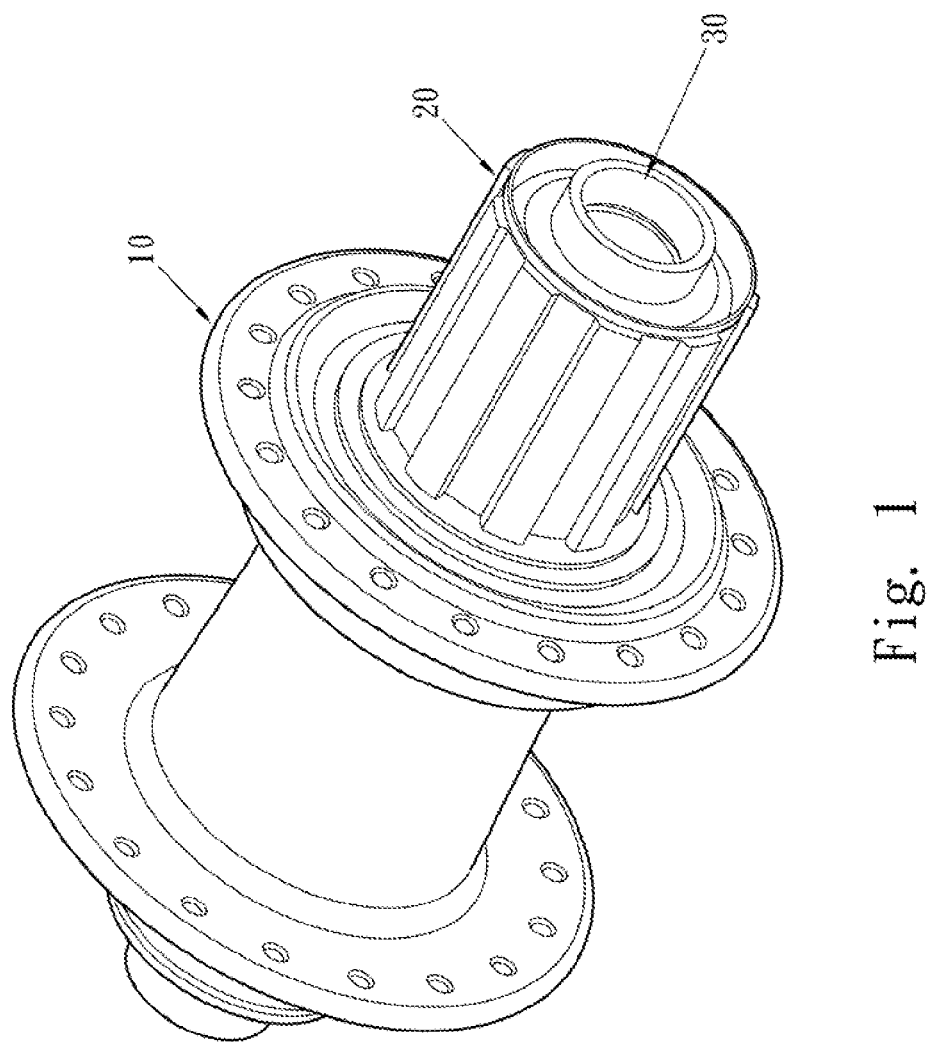
FIG. 1 is a perspective view to show the bicycle hub driving system of the present invention.
Figure 2:
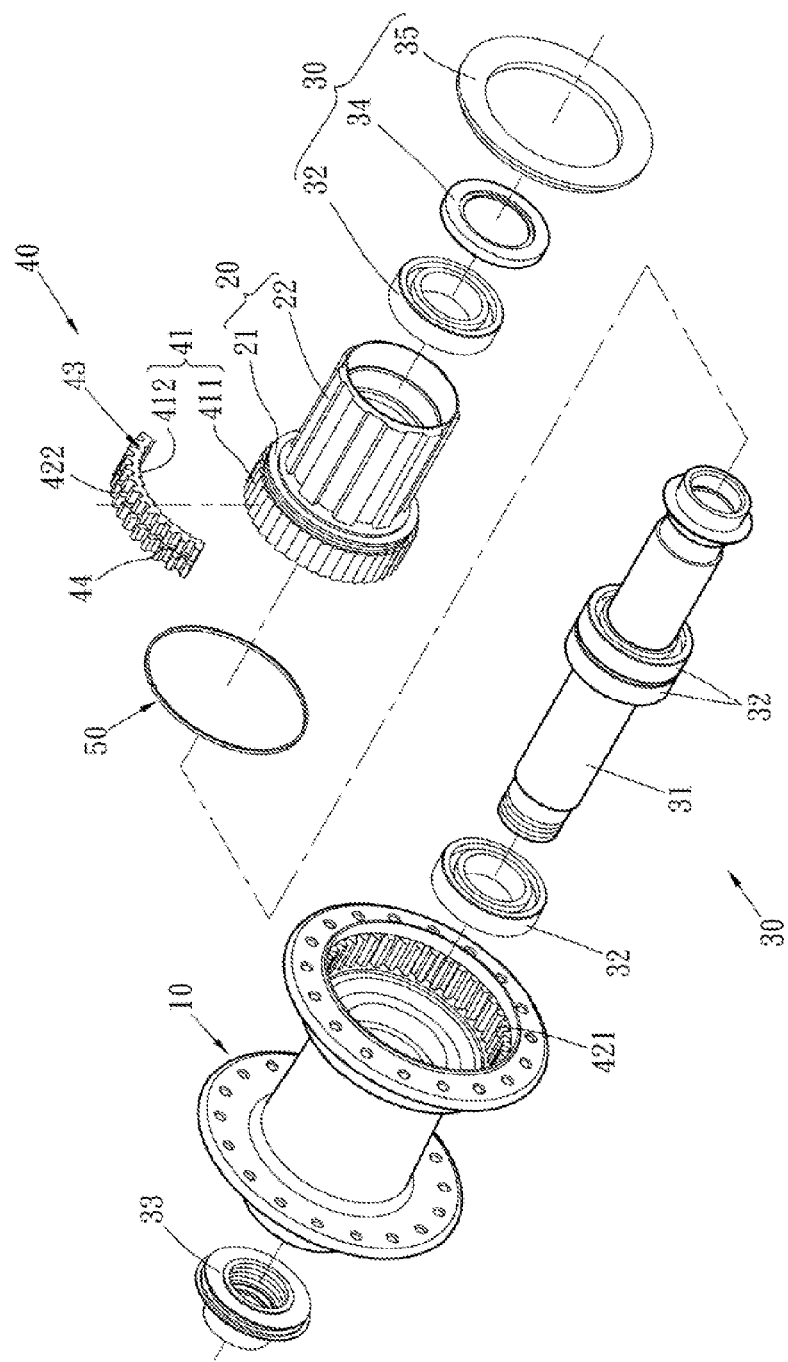
FIG. 2 is an exploded view to show the bicycle hub driving system of the present invention.
Figure 3:
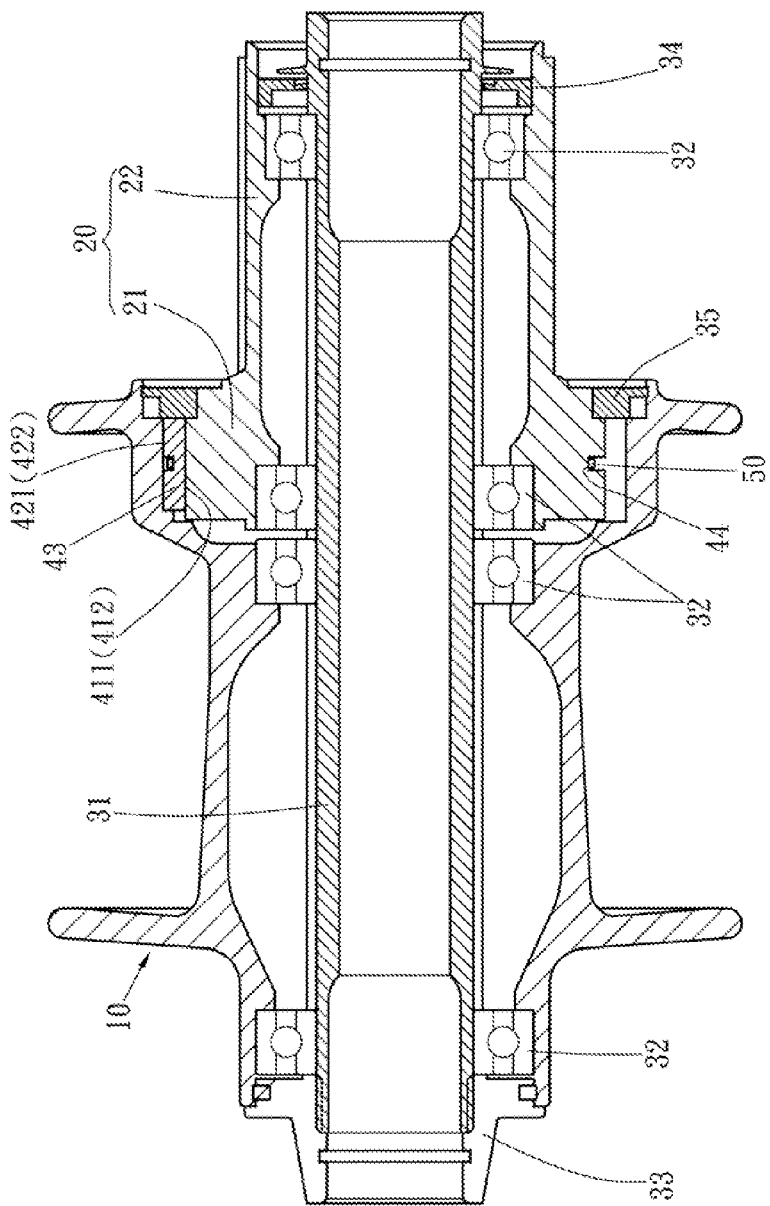
FIG. 3 is a cross sectional view to show the bicycle hub driving system of the present invention.

Referring to FIGS. 1 to 5, the bicycle hub driving system of the present invention comprises a hub 10, a socket unit 20 connected to the hub 10, an axle unit 30, a clutch driving device 40, and a return member 50.

The hub 10 is a hollow hub and located at the center of a bicycle wheel.

The socket unit 20 is a hollow socket and a ratchet unit 21 and a flywheel unit 22 are respectively mounted to the socket unit 20. The ratchet unit 21 is located in one inner end of the hub 10 and the flywheel unit 22 is to be connected with a sprocket unit.

The axle unit 30 is located between the hub 10 and the socket unit 20, and comprises an axle 31 extending therethrough. Three rotary members 32 are respectively located between the axle 31 and the inner periphery of the hub 10, and between the axle 31 and the socket unit 20. The axle 31 extends into the hub via the exposed end of the socket unit 20 and extends through the rotary members 32. A sealing member 33 is threadedly connected to the other end of the hub 10. A first seal ring 34 is located between the inner periphery of the socket unit 20 and the axle 31, and a second seal ring 35 is located between the inner periphery of the hub 10 and the socket unit 20.

The clutch driving device 40 is located between the ratchet unit 21 and the inner periphery of the hub 10, and the clutch driving device 40 comprises a clutch unit 41, a driving unit 42 and a driving member 43 located between the clutch unit 41 and the driving unit 42. The driving member 43 is a curved member which shares a common center with the hub 10 and the socket unit 20. The driving member 43 has an outer curved face and an inner curved face. The clutch unit 41 comprises a first ratchet portion 411 and a second ratchet portion 412, wherein the first ratchet portion 411 is located on the ratchet unit 21 and the second ratchet portion 412 is connected to the driving member 43. The driving unit 42 comprises first driving teeth 421 and second driving teeth 422, wherein the first driving teeth 421 are defined in the inner end of the hub 10 and the second driving teeth 422 are defined in the driving member 43. The first driving teeth 421 are engaged with the second driving teeth 422. The driving member 43 is movable linearly and radially between the first ratchet portion 411 and the first driving teeth 421 to engage the first ratchet portion 411 with second ratchet portion 412, or to disengage the first ratchet portion 411 from the second ratchet portion 412, and to co-rotate the hub 10 with the socket unit 20, or to separate the hub 10 from the socket unit 20. By the engagement between the first ratchet portion 411 with second ratchet portion 412 of the socket unit 20, the hub 10 is co-rotated while the first driving teeth 421 are engaged with second driving teeth 422. The second driving teeth 422 have a groove 44 which separates the second driving teeth 422 into two parallel teeth.

The return member 50 is a ring and engaged with the groove 44. The return member 50 is mounted to the driving member 43 and the first ratchet portion 411 to move the driving member 43 linearly toward the first ratchet portion 411.

The hub 10 has the first driving teeth 421 defined integrally therewith and the first ratchet portion 411 is integrally formed with the socket unit 20. The rotary members 32 are respectively to the axle 31, and the driving member 43 is positioned on the outside of the first ratchet portion 411 by the returning member 50. The rerun member 50 is engaged with the groove 44 and the first and second ratchet portions 411, 412 are engaged with each other. The driving member 43 is engaged with the first driving teeth 421 so as to engage the first driving teeth 421 with the second driving teeth 422. The axle 31 and the rotary members 32 are inserted into the hub 10 and the socket unit 20 via one end of the socket unit 20. The sealing member 33 is connected to the other end of the hub 10. Finally, the first seal ring 34 is located between the inner periphery of the socket unit 20 and the axle 31, and the second seal ring 35 is located between the inner periphery of the hub 10 and the socket unit 20 to finish the assembly.

Figure 4:
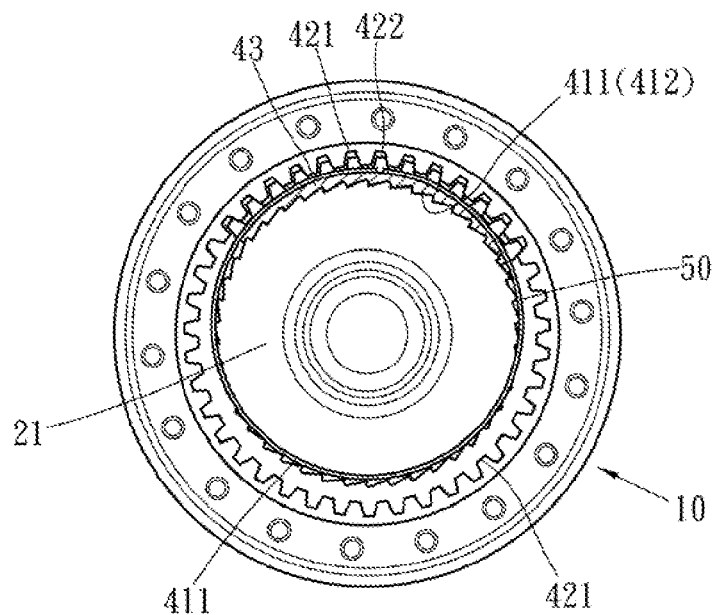
FIG. 4 is an end view of the bicycle hub driving system of the present invention.
Figure 5:
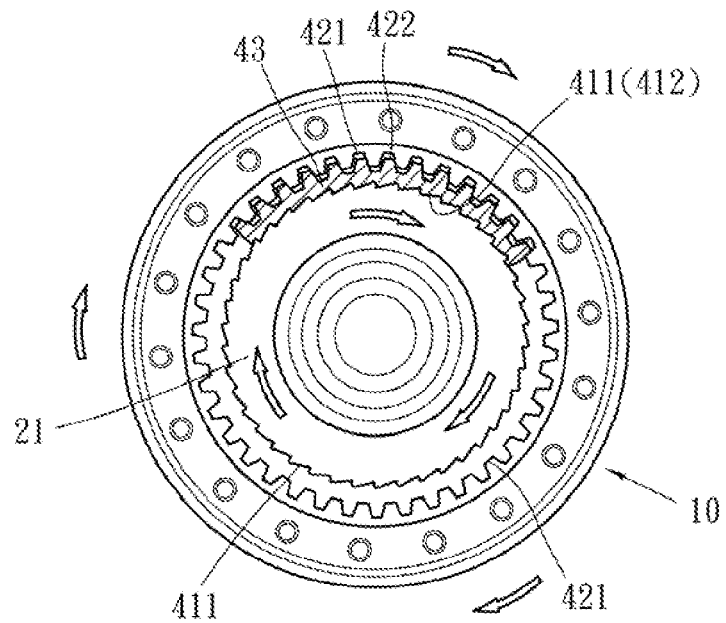
FIG. 5 is another end view of the bicycle hub driving system of the present invention.

As shown in FIGS. 4 and 5, the return member 50 provides a force to move the driving member 43 toward the ratchet unit 21 so as to engage the first ratchet portion 411 with the second ratchet portion 412. When the socket unit 20 is driven by the chain, the first ratchet portion 411 is engaged with the second ratchet portion 412, and the driving member 43 is driven. The engagement between the first and second driving teeth 421, 422 indirectly drives the hub 10 in the same direction to move the bicycle forward.

Figure 6:
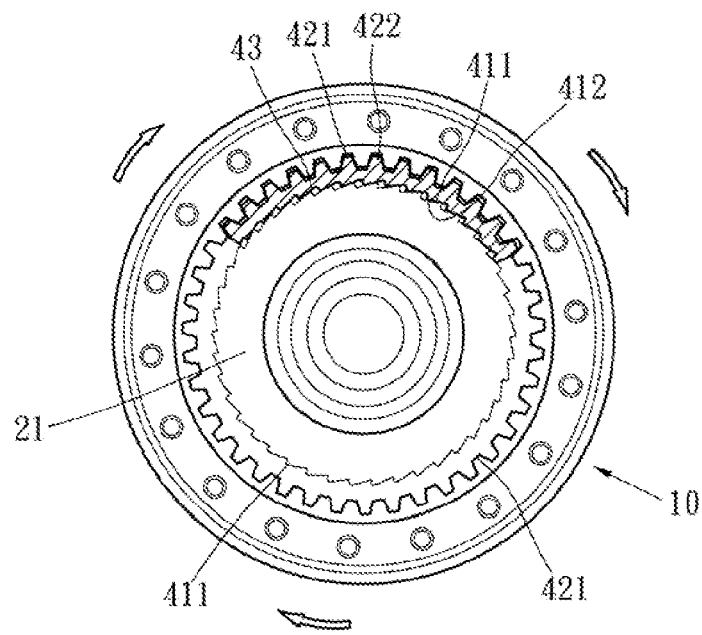
FIG. 6 is an end view to show the disengaged status of the bicycle hub driving system of the present invention.
Figure 7:
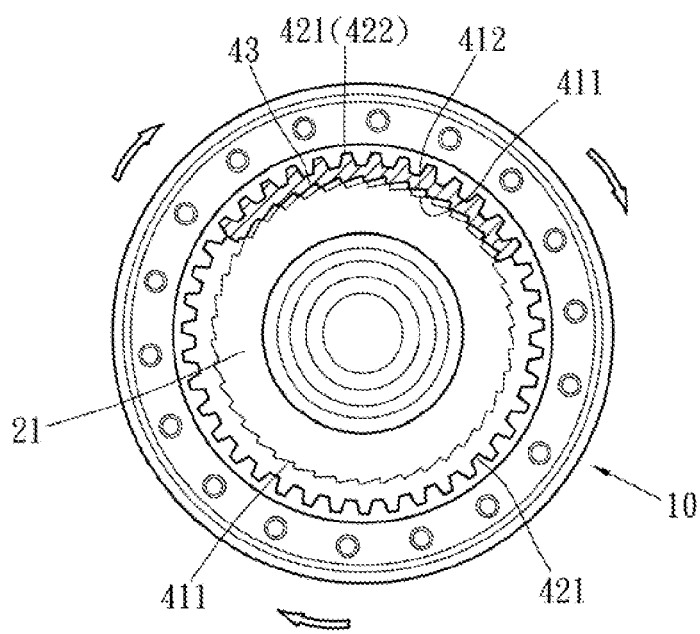
FIG. 7 is another end view to show the disengaged status of the bicycle hub driving system of the present invention.

As shown in FIGS. 6 and 7, when the socket unit 20 is not driven by the chain, in other words, the pedals are not treaded, the socket unit 20 is not rotated, while the driving member 43 and the hub 10 are co-rotated, so that the first ratchet portion 411 is disengaged from the second ratchet portion 412. FIG. 6 shows that the first ratchet portion 411 is partially disengaged from the second ratchet portion 412, and FIG. 7 shows that the first ratchet portion 411 is completely disengaged from the second ratchet portion 412. The clutch driving device 40 now freely rotates and no work is output. The hub 10 rotates forward by the initial force.

The clutch driving device 40 of the present invention has a driving member 43 which is able to linearly moveable and drives the hub radially. The driving member 43 is located between the hub 10 and the socket unit 20. By using the driving unit 42 located between the driving member 43 and the hub 10, the first and second driving teeth 421, 422 are engaged with each other to transfer force. The clutch unit 41 is located between the driving member 43 and the socket unit 20, and the first and second ratchet portions 411, 411 are cooperated with each other to drive the hub 10 in one direction. In detail, when the first and second ratchet portions 411, 412 are disengaged from each other, the first and second driving teeth 421, 422 are engaged with each other. When the first and second ratchet portions 411, 412 are engaged with each other, the first and second driving teeth 421, 422 are disengaged from each other.

The driving member 43 is linearly movable between the first driving teeth 421 and the first ratchet portion 411 so that the clutch driving device 40 radially drives the hub 10 and the driving member 43 is sensitive and responds quickly to improve the delayed action of the pawls used in the conventional driving devices.

The driving member 43 has multiple ratchet teeth and driving teeth, the second driving teeth 433 are formed on the outside of the driving member 43 and the second ratchet portion 412 is defined in the inner side of the driving member 43. The engagement between the first and second driving teeth 421, 422, and the engagement between the first and second ratchet portions 411, 412 provide larger contact area to increase the driving force and reduce wearing. The arrangement improves the shortcoming of less driving force of the conventional driving devices.

The multiple ratchet teeth of the second ratchet portion 412 evenly share the force so that the wearing for the ratchet teeth of the second ratchet portion 412 is even. Furthermore, even if one of the ratchet teeth of the second ratchet portion 412 is damaged, the rest of the ratchet teeth are able to perform normally without replacing any part. This also improves the shortcoming of the replacement of the pawls of the conventional driving devices.

Figure 8:
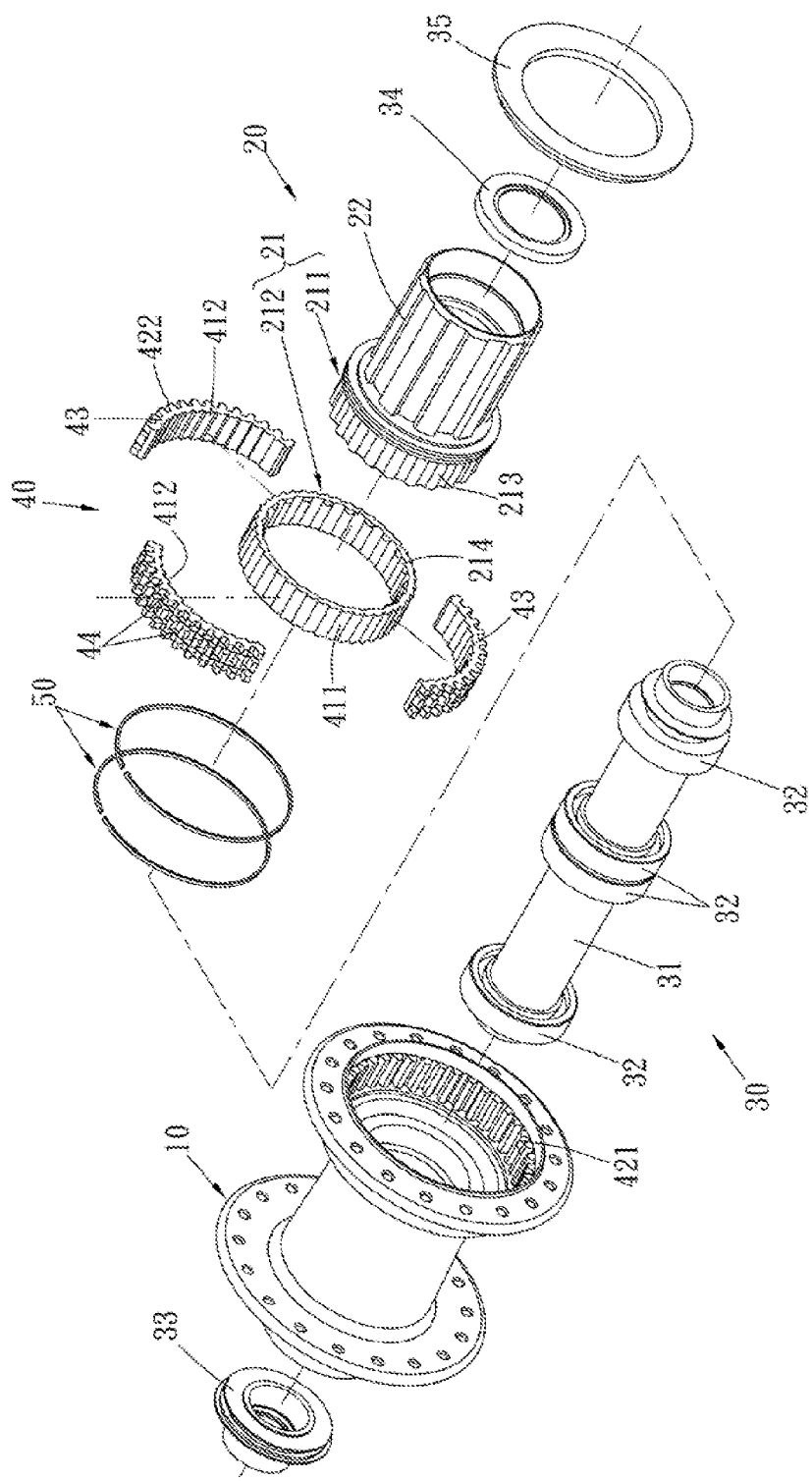
FIG. 8 is an exploded view to show the second embodiment of the bicycle hub driving system of the present invention.
Figure 9:
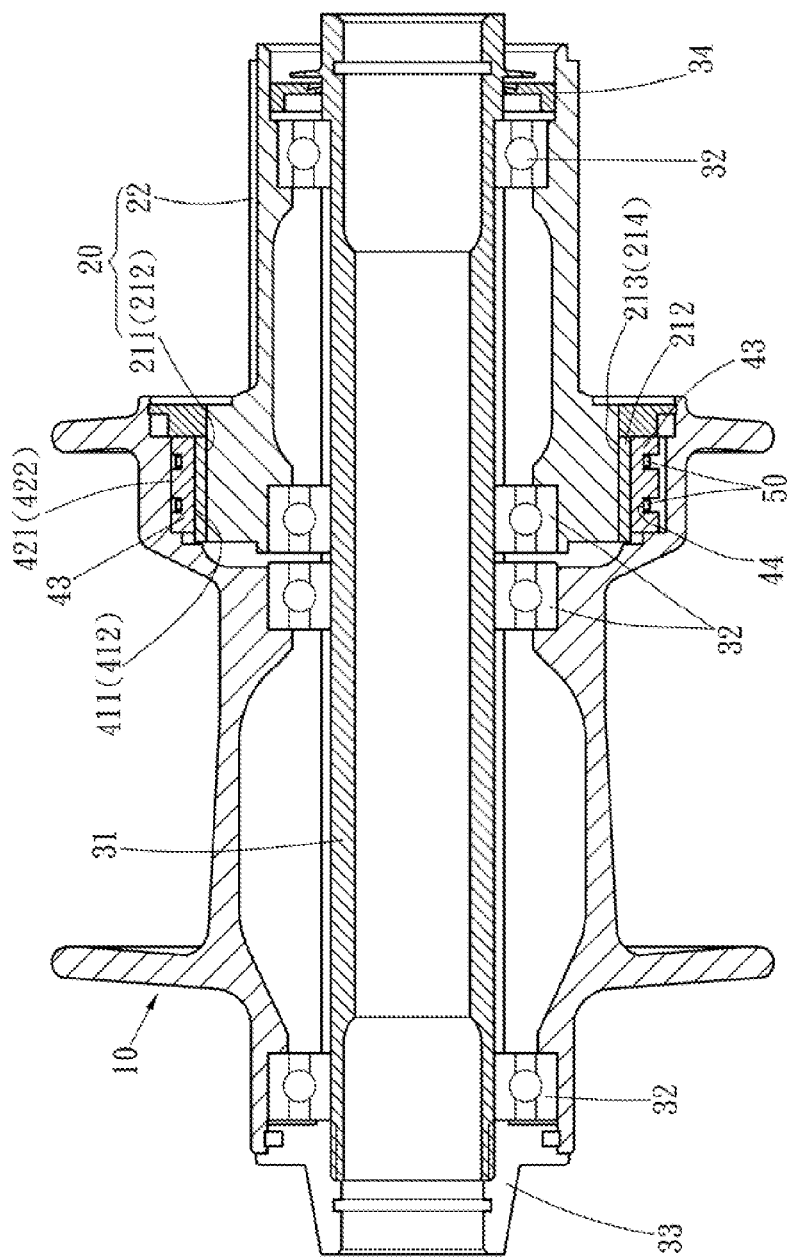
FIG. 9 is a cross sectional view to show the second embodiment of the bicycle hub driving system of the present invention.
Figure 10:
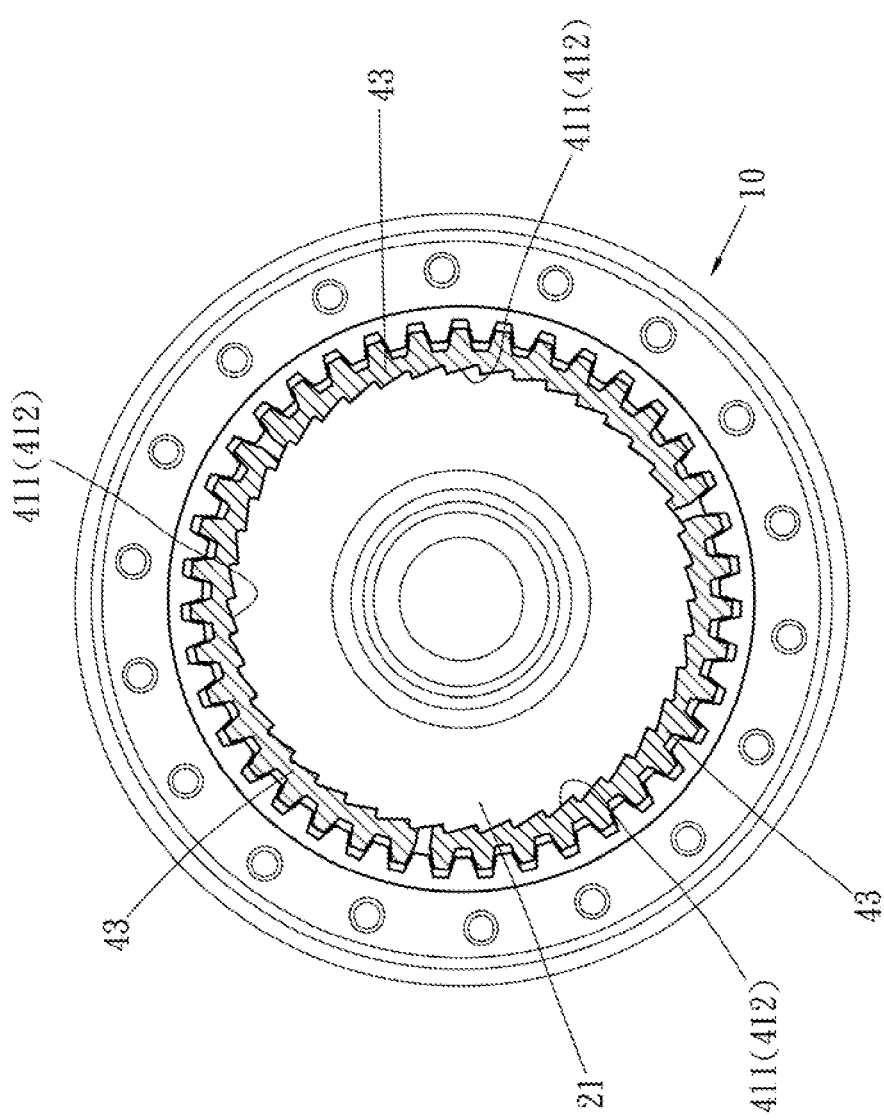
FIG. 10 is an end view of the second embodiment of the bicycle hub driving system of the present invention.
Figure 11:
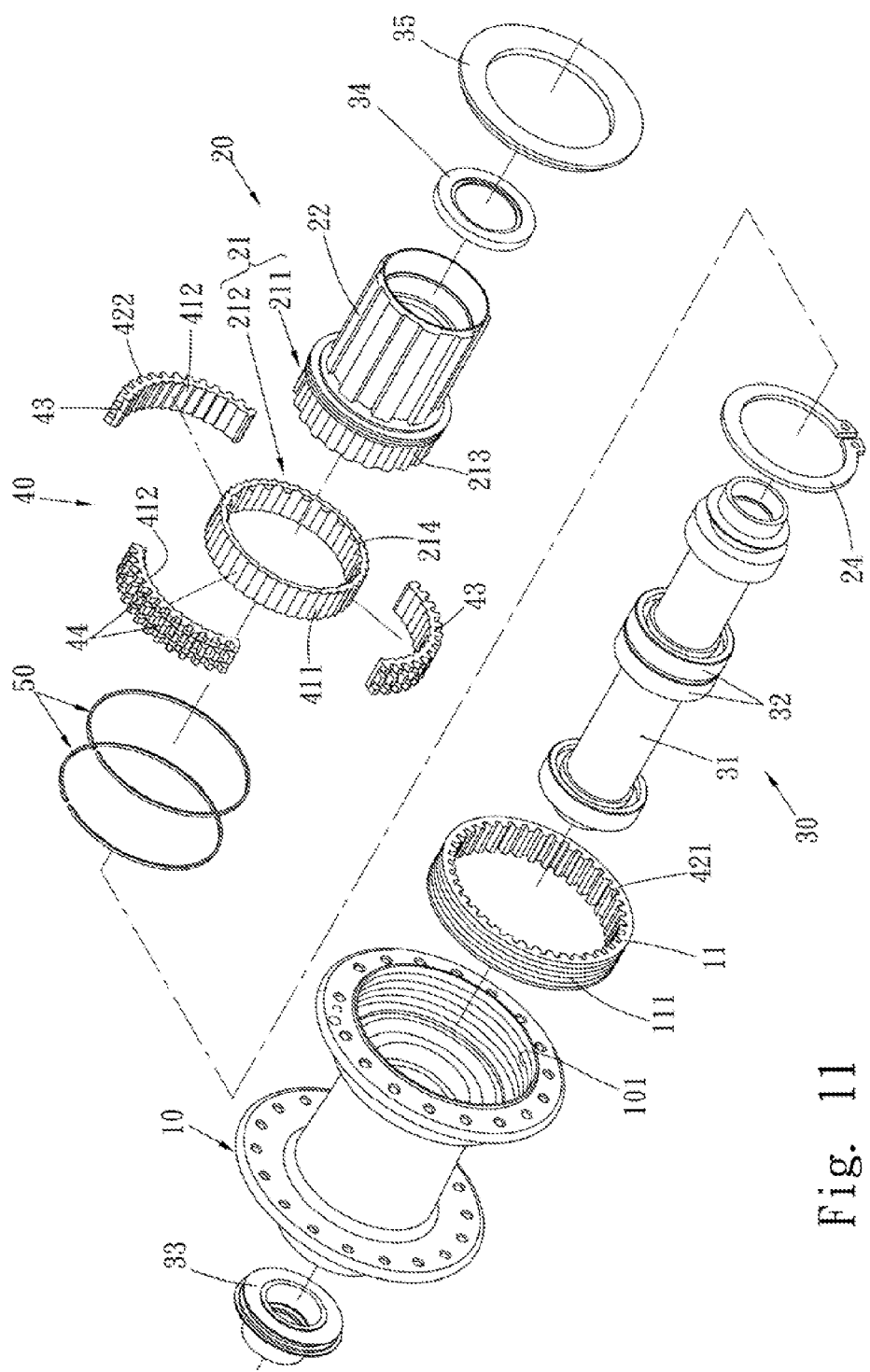
FIG. 11 is an exploded view to show the third embodiment of the bicycle hub driving system of the present invention.
Figure 12:
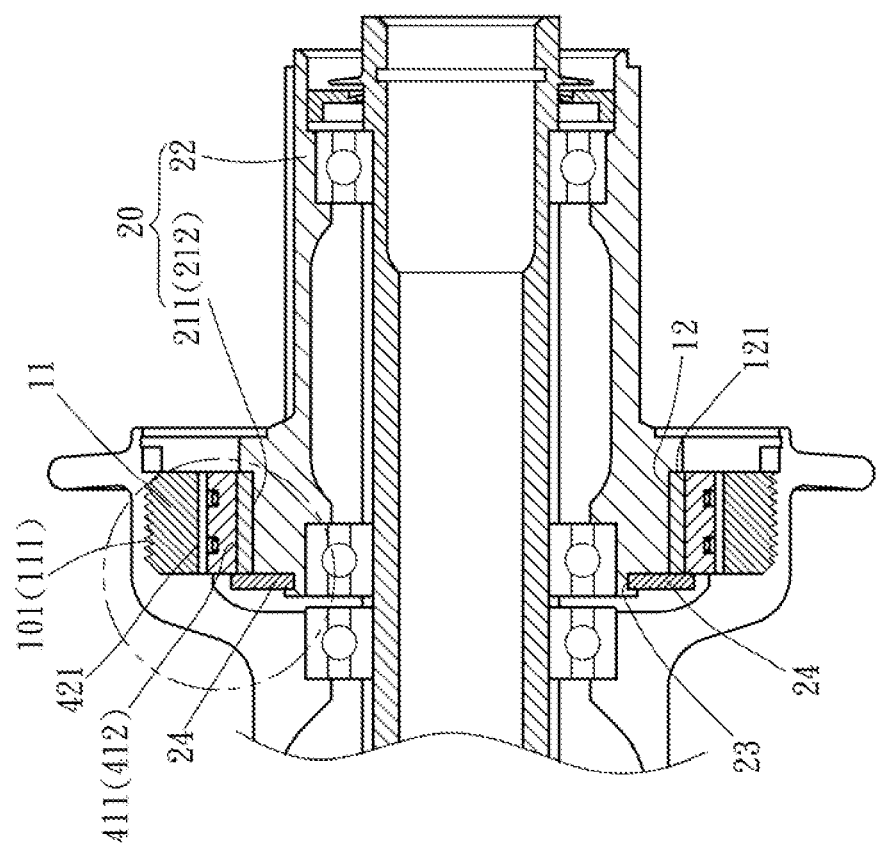
FIG. 12 is a cross sectional view to show the third embodiment of the bicycle hub driving system of the present invention.
Figure 13:
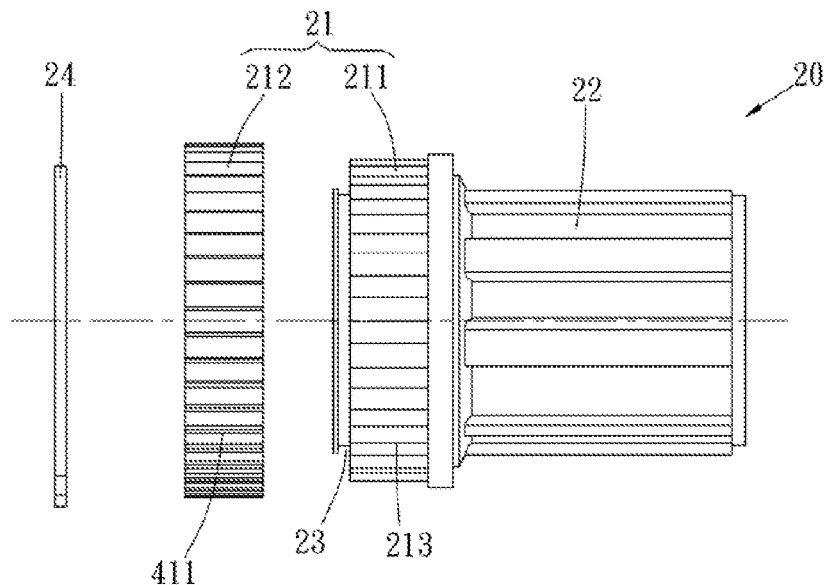
FIG. 13 shows the socket unit and the positioning clip of the third embodiment of the bicycle hub driving system of the present invention.
Figure 14:
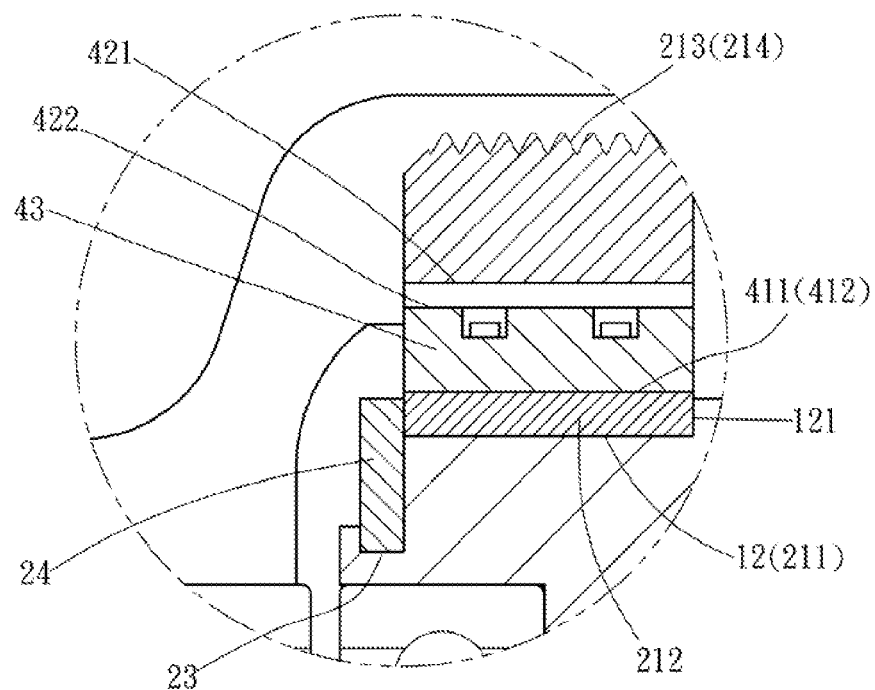
FIG. 14 is an enlarged cross sectional view of the third embodiment of the bicycle hub driving system of the present invention.

As shown in FIGS. 8 to 10, the second embodiment is disclosed, wherein the ratchet unit 21 comprises a connection part 211 and a ring 212 on the socket unit 20. The connection part 211 is a ring-shaped part and has multiple first positioning portions 213 extending axially therefrom. The ring 212 has the first ratchet portion 411 defined in the outer periphery thereof and second positioning portions 214 are defined in the inner periphery of the ring 212. The first positioning portions 213 are engaged with the second positioning portions 214. There are three driving members 43 are located between the first ratchet portion 411 and the first driving teeth 421. The second ratchet portion 412 has two grooves 44 defined axially therein and the two grooves 44 are parallel to each other so as to define the second ratchet portion 412 into three rows of ratchet teeth. There are two return members 50 are respectively engaged with the grooves 44 to position the driving members 43.

The ratchet unit 21 of this embodiment comprises the connection part 211 and a ring 212 which is connected to the connection part 211 by the engagement between the first and second positioning portions 213, 214. This embodiment also provides multiple driving members 43 which provide larger driving force while the user saves effort to operate the driving system.

FIGS. 11 to 14 disclose the third embodiment of the present invention, wherein the hub 10 has the ring-shaped driving ring 11 connected to an inner end thereof and the first driving teeth 421 are defined in the inner periphery of the driving ring 11. The driving ring 11 is threadedly connected to the inner end of the hub 10. The socket unit 20 extends from one end of the hub 10 and has a positioning slot 23 defined in the outer periphery thereof. A positioning clip 24 is engaged with the positioning slot 23 and one side of the positioning clip 24 contacts one side of the driving member 43 to prevent the driving member 43 from moving axially on the first ratchet portion 411. The socket unit 20 has a contact slot 12 defined in the outer periphery thereof and the contact slot 12 has a contact face 121 defined in one of insides thereof. The driving member 43 is mounted to the contact slot 12 and two sides of the driving member 43 respectively contact the positioning clip 24 and the contact face 121.

The two sides of the driving member 43 are respectively in contact with the positioning clip 24 and the contact face 121 so that it does not shift axially to reduce loss of the transmission force.

Figure 15:
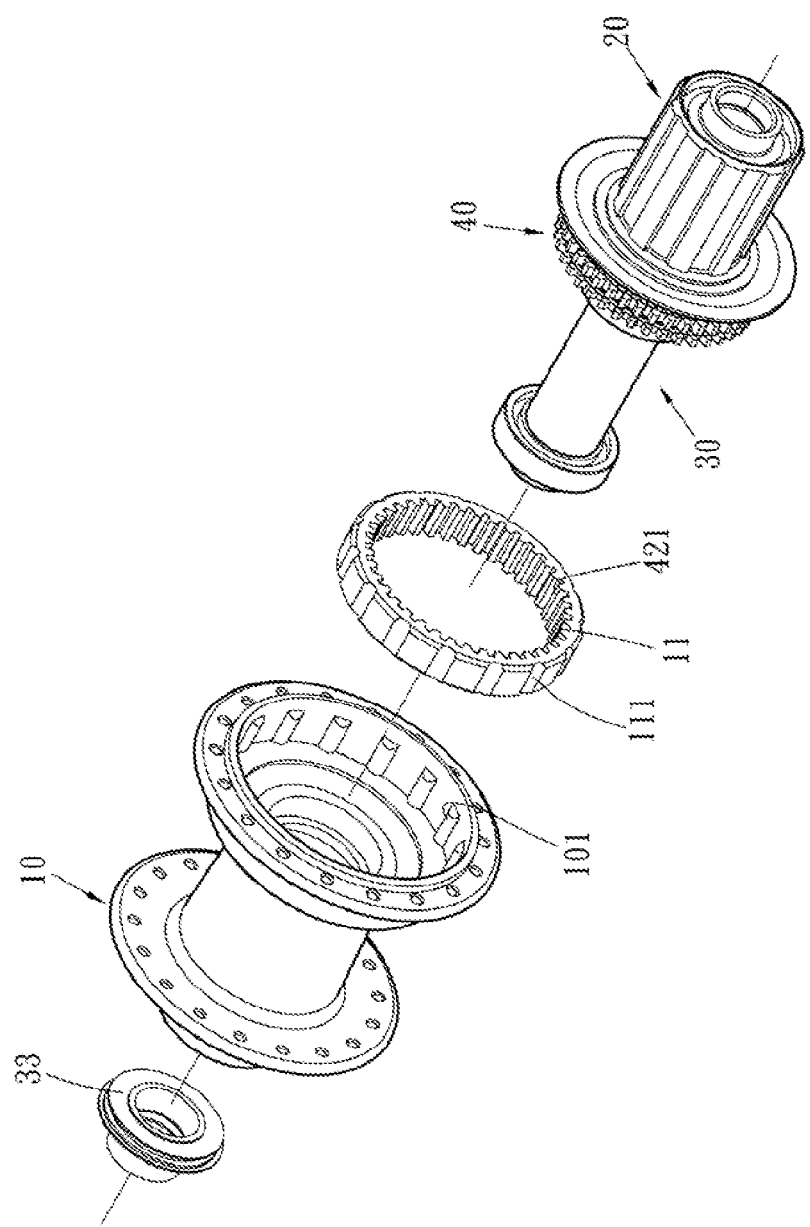
FIG. 15 is an exploded view to show the fourth embodiment of the bicycle hub driving system of the present invention.
Figure 16:
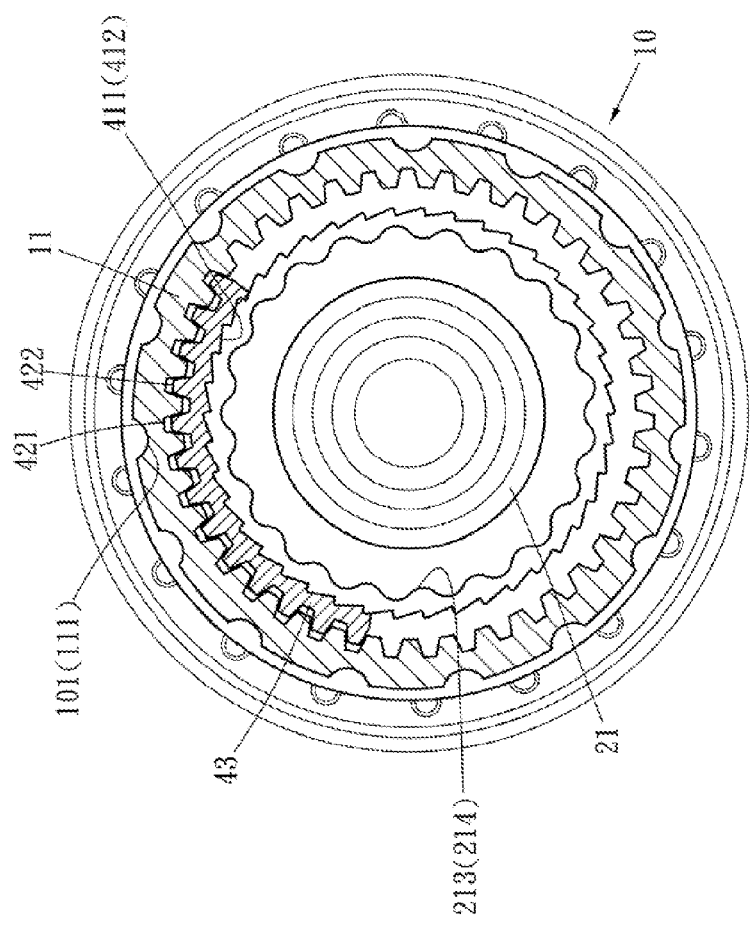
FIG. 16 is an end view of the fourth embodiment of the bicycle hub driving system of the present invention.

FIGS. 15 and 16 show the fourth embodiment of the present invention, wherein the hub 10 has multiple first connection portions 101 extending axially therefrom and the driving ring 11 has multiple second connection portions 111 which are engaged with the first connection portions 101.

Figure 17:
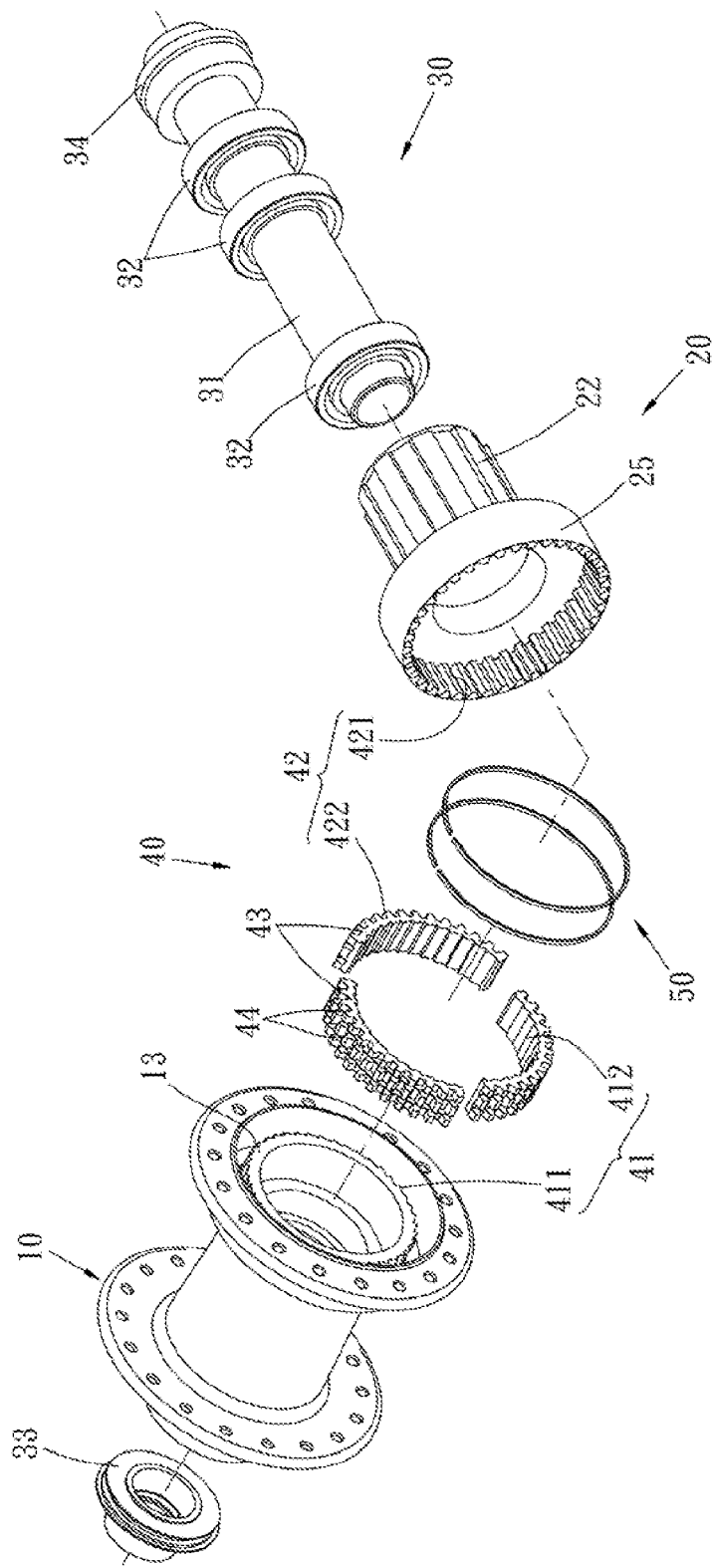
FIG. 17 is an exploded view to show the fifth embodiment of the bicycle hub driving system of the present invention.
Figure 18:
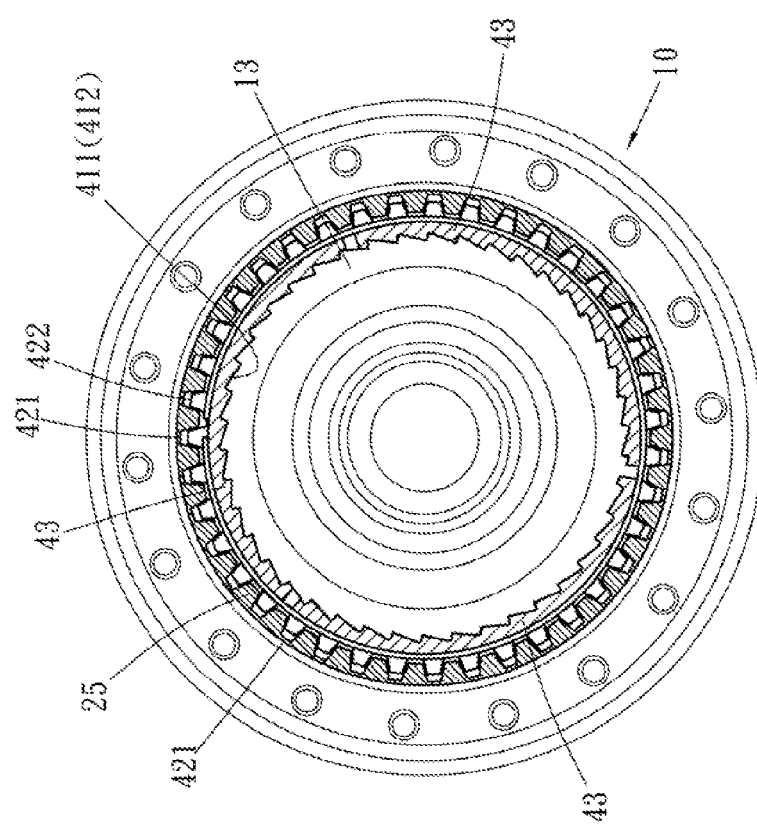
FIG. 18 is an end view of the fifth embodiment of the bicycle hub driving system of the present invention.

FIGS. 17 and 18 show the fifth embodiment of the present invention and comprise a hub 10 adapted located at the center of the wheel and the hub 10 is a hollow hub. A ratchet unit 13 is located in one inner end of the hub 10. A socket unit 20 is a hollow socket, and a driving unit 25 and a flywheel unit 22 are respectively mounted to the socket unit 20. The driving unit 25 extends toward and is located on the outer periphery of the ratchet unit 13. The flywheel unit 22 is adapted to be connected with a sprocket unit. An axle unit 30 is located between the hub 10 and the socket unit 20. The axle unit 30 has an axle 31 extending therethrough. Three rotary members 32 are located between the axle 31 and the inner periphery of the hub 10, and between the axle 31 and the socket unit 20. A clutch driving device 40 is located between the ratchet unit 13 and the inner periphery of the driving unit 25. The clutch driving device 40 has a clutch unit 41, a driving unit 42 and three driving members 43 which are located between the clutch unit 41 and the driving unit 42. The clutch unit 41 comprises a first ratchet portion 411 and a second ratchet portion 412, wherein the first ratchet portion 411 is located on the ratchet unit 13 and the second ratchet portion 412 is connected to each of the driving members 43. The driving unit 42 comprises first driving teeth 421 and second driving teeth 422, wherein the first driving teeth 421 are defined in the inner end of the driving unit 25 and the second driving teeth 422 defined in each of the driving members 43. The first driving teeth 421 are engaged with the second driving teeth 422. The driving members 43 are movable linearly and radially between the first ratchet portion 411 and the first driving teeth 421 to engage the first ratchet portion 411 with second ratchet portion 412, or to disengage the first ratchet portion 411 from the second ratchet portion 412, and to co-rotate the hub 10 with the socket unit 20, or to separate the hub 10 from the socket unit 20. The socket unit 20 drives the hub 10 by the engagement between the first ratchet portion 411 with second ratchet portion 412 indirectly rotating the engagement between the first driving teeth 421 with second driving teeth 422. A return member 50 is mounted to the driving members 43 and the first ratchet portion 411 to move the driving members 43 linearly toward the first ratchet portion 411.

This embodiment provides the driving unit 25 connected to the socket unit and the ratchet unit 13 is located in the hub 10. The first driving teeth 421 are located in the driving unit 25 which is installed in the hub 10. The driving members 43 are located between the driving unit 42 and the ratchet unit 41.

The bicycle hub driving system can bear high driving force and has high sensitivity. The driving members 43 move linearly and drive the hub 10 radially so that the operation of the hub 10 saves effort and the hub 10 is operated sensitively. The driving members of the clutch driving device 40 have multiple ratchet teeth and multiple driving teeth so as to have larger contact area to increase the transmission force. The load to the clutch driving device 40 is evenly spread to the ratchet portions 411, 412 so that the wearing for the ratchet teeth are even so as to avoid single ratchet tooth from overly worn out. The driving members 43 have multiple ratchet teeth so that even if one of the ratchet teeth is damaged, the driving member can be operated normally.

While we have shown and described the embodiment in accordance with the present invention, it should be clear to those skilled in the art that further embodiments may be made without departing from the scope of the present invention.

What is claimed is:
1. A bicycle hub driving system comprising:
a hub adapted located at a center of a wheel and being a hollow hub;
a socket unit being a hollow socket and a ratchet unit and a flywheel unit respectively mounted to the socket unit, the ratchet unit located in an inner end of the hub, the flywheel unit adapted to be connected with a sprocket unit;
an axle unit located between the hub and the socket unit, the axle unit having an axle extending therethrough, at least one rotary member located between the axle and an inner periphery of the hub, and between the axle and the socket unit;
a clutch driving device located between the ratchet unit and the inner periphery of the hub, the clutch driving device having a clutch unit, a driving unit and at least one driving member located between the clutch unit and the driving unit, the clutch unit comprising a first ratchet portion and a second ratchet portion, the first ratchet portion located on the ratchet unit and the second ratchet portion connected to the at least one driving member, the driving unit comprising first driving teeth and second driving teeth, the first driving teeth defined in the inner end of the hub and the second driving teeth defined in the at least one driving member, the first driving teeth engaged with the second driving teeth, the at least one driving member movable linearly and radially between the first ratchet portion and the first driving teeth to engage the first ratchet portion with second ratchet portion, or to disengage the first ratchet portion from the second ratchet portion, and to co-rotate the hub with the socket unit, or to separate the hub from the socket unit, the socket unit driving the hub by engagement between the first ratchet portion with second ratchet portion of the socket unit indirectly rotating engagement between the first driving teeth with second driving teeth, and
a return member mounted to the at least one driving member and the first ratchet portion to move the at least one driving member linearly toward the first ratchet portion.
2. The driving system as claimed in claim 1, wherein when the first and second ratchet portions are disengaged from each other, the first and second driving teeth are engaged with each other, when the first and second ratchet portions are engaged with each other, the first and second driving teeth are disengaged from each other.
3. The driving system as claimed in claim 1, wherein a first seal ring is located between an inner periphery of the socket unit and the axle.
4. The driving system as claimed in claim 1, wherein a second seal ring is located between the inner periphery of the hub and the socket unit.
5. The driving system as claimed in claim 1, wherein the second driving teeth has at least one groove which separates the second driving teeth into two parallel teeth, the return member is engaged with the at least one groove, the return member is a ring.
6. The driving system as claimed in claim 1, wherein the ratchet unit comprises a connection part and a ring on the socket unit, the connection part being a ring-shaped part and has multiple first positioning portions extending axially therefrom, the ring has the first ratchet portion defined in an outer periphery thereof and second positioning portions are defined in an inner periphery of the ring, the first positioning portions are engaged with the second positioning portions.
7. The driving system as claimed in claim 1, wherein the hub has a driving ring connected to the inner periphery thereof and the first driving teeth are defined in an inner periphery of the driving ring.
8. The driving system as claimed in claim 7, wherein the hub has multiple first connection portions extending axially therefrom and the driving ring has multiple second connection portions which are engaged with the first connection portions.

9. The driving system as claimed in claim 1, wherein the socket unit has a positioning slot defined in an outer periphery thereof, a positioning clip is engaged with the positioning slot and one side of the positioning clip contacts one side of the at least one driving member to prevent the at least one driving member from moving axially on the first ratchet portion.

10. The driving system as claimed in claim 9, wherein the socket unit has a contact slot defined in the outer periphery thereof, the contact slot has a contact face defined in one of insides thereof, the at least one driving member is mounted to the contact slot and two sides of the at least one driving member respectively contact the positioning clip and the contact face.

11. A bicycle hub driving system comprising:
a hub adapted located at a center of a wheel and being a hollow hub, a ratchet unit located in an inner end of the hub;
a socket unit being a hollow socket, a driving unit and a flywheel unit respectively mounted to the socket unit, the driving unit extending and located on an outer periphery of the ratchet unit, the flywheel unit adapted to be connected with a sprocket unit;
an axle unit located between the hub and the socket unit, the axle unit having an axle extending therethrough, at least one rotary member located between the axle and an inner periphery of the hub, and between the axle and the socket unit;
a clutch driving device located between the ratchet unit and an inner periphery of the driving unit, the clutch driving device having a clutch unit, a driving unit and at least one driving member located between the clutch unit and the driving unit, the clutch unit comprising a first ratchet portion and a second ratchet portion, the first ratchet portion located on the ratchet unit and the second ratchet portion connected to the at least one driving member, the driving unit comprising first driving teeth and second driving teeth, the first driving teeth defined in the inner end of the driving unit and the second driving teeth defined in the at least one driving member, the first driving teeth engaged with the second driving teeth, the at least one driving member movable linearly and radially between the first ratchet portion and the first driving teeth to engage the first ratchet portion with second ratchet portion, or to disengage the first ratchet portion from the second ratchet portion, and to co-rotate the hub with the socket unit, or to separate the hub from the socket unit, engagement between the first ratchet portion with second ratchet portion of the socket unit rotating engagement between the first driving teeth with second driving teeth of the hub, and
a return member mounted to the at least one driving member and the first ratchet portion to move the at least one driving member linearly toward the first ratchet portion.

12. The driving system as claimed in claim 11, wherein a first seal ring is located between an inner periphery of the socket unit and the axle.

13. The driving system as claimed in claim 11, wherein a second seal ring is located between the inner periphery of the hub and the socket unit.

14. The driving system as claimed in claim 11, wherein the second driving teeth has at least one groove which separates the second driving teeth into two parallel teeth, the return member is engaged with the at least one groove, the return member is a ring.

* * * * *